(12) United States Patent
Horii et al.

(10) Patent No.: US 10,127,061 B2
(45) Date of Patent: Nov. 13, 2018

(54) CONTROLLING PRIORITY OF DYNAMIC COMPILATION

(71) Applicant: INTERNATIONAL BUSINESS MACHINES CORPORATION, Armonk, NY (US)

(72) Inventors: Hiroshi Horii, Tokyo (JP); Hiroshi Inoue, Tokyo (JP); Tamiya Onodera, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/832,726

(22) Filed: Aug. 21, 2015

(65) Prior Publication Data

US 2017/0052804 A1    Feb. 23, 2017

(51) Int. Cl.
G06F 9/44    (2018.01)
G06F 9/455    (2018.01)
G06F 9/48    (2006.01)
G06F 8/60    (2018.01)

(52) U.S. Cl.
CPC ........ G06F 9/45525 (2013.01); G06F 9/4552 (2013.01); G06F 9/48 (2013.01); G06F 8/60 (2013.01)

(58) Field of Classification Search
CPC ..... G06F 9/44; G06F 8/41; G06F 8/45; G06F 8/48
USPC ........................................................ 717/140
See application file for complete search history.

(56) References Cited

U.S. PATENT DOCUMENTS

| | | | | |
|---|---|---|---|---|
| 7,171,654 | B2* | 1/2007 | Werme | G06F 9/06 709/224 |
| 7,987,452 | B2 | 7/2011 | Kronlund et al. | |
| 8,230,201 | B2 | 7/2012 | Arimilli et al. | |
| 2007/0300230 | A1* | 12/2007 | Barsness | G06F 9/4881 718/103 |
| 2009/0070762 | A1* | 3/2009 | Franaszek | G06F 9/4881 718/102 |
| 2012/0144377 | A1* | 6/2012 | Pirvu | G06F 9/45516 717/148 |
| 2012/0284720 | A1* | 11/2012 | Cain, III | G06F 9/4881 718/101 |
| 2013/0024867 | A1* | 1/2013 | Glew | G06F 9/4881 718/104 |
| 2013/0347002 | A1* | 12/2013 | Basu | G06F 9/485 718/107 |

(Continued)

*Primary Examiner* — Duy Khuong T Nguyen
(74) *Attorney, Agent, or Firm* — Tutunjian & Bitetto, P.C.; Vazken Alexanian

(57) ABSTRACT

A method for controlling priority of dynamic compilation by a computer system is disclosed. A task is executed by using a thread pooled in a thread pool. A metric related to the dynamic compilation is monitored. And then, determination is done whether the metric meets a predetermined criterion. In returning of the thread to the thread pool for next execution, a lowering of priority of the thread is caused if the metric is determined to meet the predetermined criterion. The lowering of priority of the thread may be caused by causing the thread to sleep for a period of time before the returning. The metric may be a length of a compilation queue for the dynamic compilation or a utilization rate of a compiler thread executing the dynamic compilation.

20 Claims, 9 Drawing Sheets

(56) References Cited

U.S. PATENT DOCUMENTS

2014/0196048 A1* 7/2014 Mathur .................. G06F 9/485
 718/104
2014/0245313 A1* 8/2014 Otenko .................. G06F 9/524
 718/103

* cited by examiner

```
01  new ThreadPoolExecutor() {
02    protected void afterExecute(
03      Runnable r, Throwable t) {
04      super.afterExecute(r, t);
05      while (jitMonitor.isBusy())
06        Thread.sleep(100L);
07  }}
```

FIG. 6A

+(warm)com/ibm/ws/webcontainer/webapp/
WebAppDispatcherContext.getPathInfo()Ljava/lang/String; @
0x0000040015894CFC-0x0000040015894E14 JavaOrdinaryMethod
Q_SZ=293 Q_SZI=292 QW=1726 bcsz=27 compThread=3 OSR=1
CpuLoad=396%(99%avg) JvmCpu=396%
+(warm) sun/nio/ch/EPollSelectorImpl.doSelect(J)I @
0x0000040016731 8F8-0x000004001673CE00 JavaOrdinaryMethod
Q_SZ=292 Q_SZI=291 QW=1720 bcsz=124 compThread=1 OSR=1
CpuLoad=402%(100%avg) JvmCpu=400%
+(warm)com/ibm/ws/webcontainer/webapp/WebGroup.stripURL(Ljava/
lang/String;Z)Ljava/lang/String; @ 0x000004001673CE78-
0x000004001673D91C JavaOrdinaryMethod Q_SZ=291 Q_SZI=290
QW=1714 bcsz=60 compThread=2 OSR=1 CpuLoad=402%(100%avg)
JvmCpu=400%

FIG. 6B

CONTROLLING PRIORITY OF DYNAMIC COMPILATION

BACKGROUND

Technical Field

The present invention, generally, relates to dynamic compilation, and more particularly, to execution of tasks with dynamic compilation by computer systems.

Description of the Related Art

Dynamic compilation such as Just-In-Time (JIT) compilation is a technique that allows for providing platform neutrality, in which native code compilation is delayed to runtime rather than prior to execution. Programming languages including Java™, Python, PHP (Hypertext Preprocessor) and Scala have implementations that employ such a dynamic compilation approach.

Elasticity is a new metric that measures adaptation capability of cloud computing systems to change of workloads over time. New servers are added when requests for an application are increased. A part of the servers are removed when the requests are decreased. The dynamic compilation can improve performance of the applications on the servers at runtime. However, it may affect the elasticity of the computing systems where the application based on such programming languages is deployed on the newly added servers. Considerable long ramp-up time may be required until reaching peak throughput, resulting in insufficient adaptation or overreaction in the cloud computing systems.

SUMMARY

One or more embodiments of the present invention provide methods, computer systems and computer program products for controlling priority of dynamic compilation.

According to an embodiment of the present invention, there is provided a method for controlling priority of dynamic compilation by a computer system. The method comprises executing a task by using a thread pooled in a thread pool. The method comprises monitoring a metric related to the dynamic compilation. The method further comprises determining whether the metric meets a predetermined criterion and causing a lowering of priority of the thread in returning of the thread to the thread pool for next execution if the metric is determined to meet the predetermined criterion.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 6A depicts program code implementing a thread pool execution module according to another exemplary embodiment of the present invention;

FIG. 6B depicts a sample compilation log obtained from a runtime environment;

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to methods, computer systems and computer program products for executing a task while controlling priority of dynamic compilation.

Now, referring to the series of FIGS. 1-5, it will be described a computer system and a method for executing a task while controlling priority of dynamic compilation according to an exemplary embodiment of the present invention.

Figure 1:
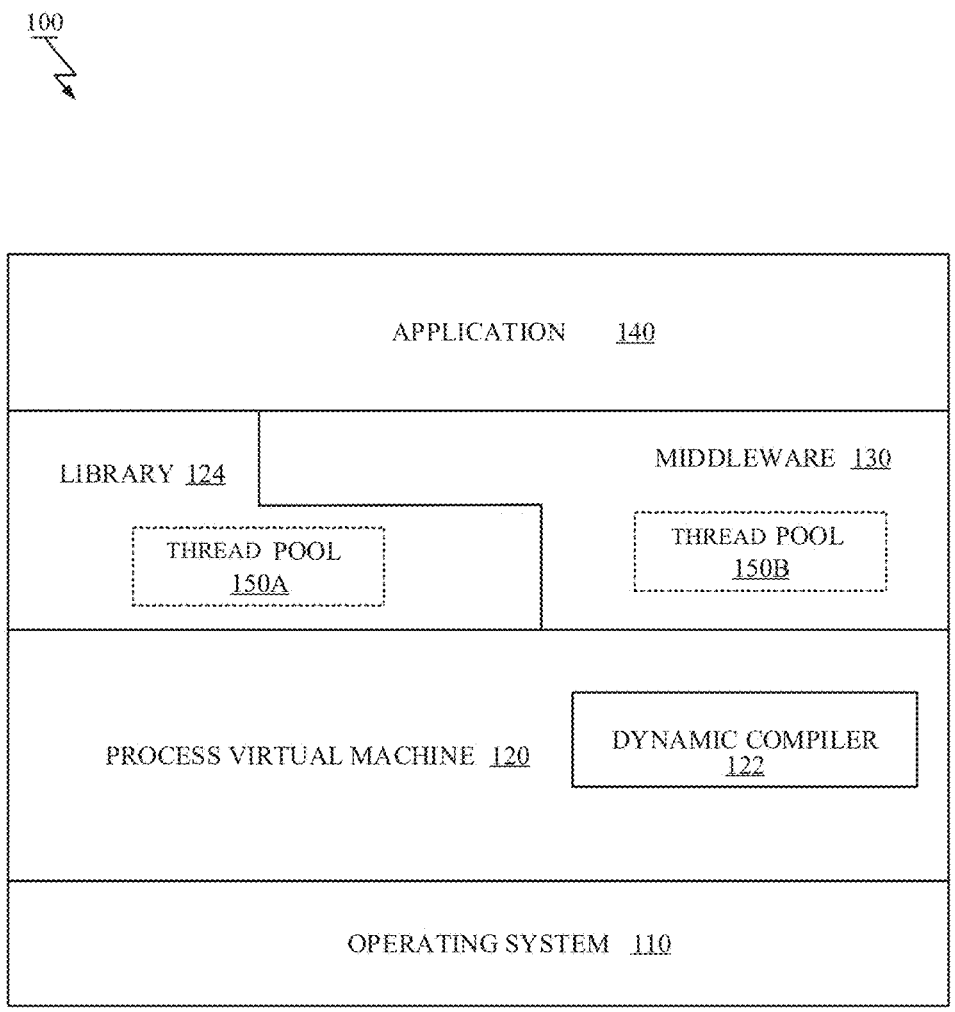
FIG. 1 shows an overview of software components on a computer system according to an exemplary embodiment of the present invention.

Referring to FIG. 1, an overview of software components on a computer system 100 is shown. As shown in FIG. 1, the computer system 100 may include an operating system 110, a process virtual machine 120, a dynamic compiler 122, a library 124, a middleware 130 and an application 140. However, the software components on the computer system 100 shown in FIG. 1 is only an example for typical computing environment and is not intended to suggest any limitation.

The operating system 110 is a system software that manages hardware and software resources of the computer system 100. The operating system 110 may be any one of known operating systems, which include z/OS®, UNIX®, Windows®, Linux®, etc.

The process virtual machine 120 provides a platform-independent program execution environment. The process virtual machine 120 may be any one of known process virtual machines, which include Java™ virtual machine (JVM), HipHop Virtual Machine (HHVM), CLR (Common Language Runtime), etc. The dynamic compiler 122 may be a JIT (Just-In-Time) compiler corresponding to the process virtual machine 120, in which frequently executing methods (code) or member functions are compiled to native machine code at runtime. The library 124 is a set of libraries that applications can call at runtime. The library 124 may include any one of known standard or extended libraries corresponding to the process virtual machine 120.

The middleware 130 provides a software framework that hosts applications. The middleware 130 may be any one of known middleware, which include Java™ Platform, Enterprise Edition (Java™ EE) based application server, .Net framework based application server, etc. The application 140 is application software hosted by the middleware 130. The application 140 may be any one of known applications, which include an online shopping system, an online stock trading system, an could storage system, an online banking system, a bulletin board system, a blogging system, a microblogging system, etc.

In a particular embodiment, the process virtual machine 120 may be the JVM and the dynamic compiler 122 may be the JIT compiler. The process virtual machine 120, the dynamic compiler 122 and the library 124 may be provided as Java™ Runtime Environment (JRE). The middleware 130 may be a Java™ EE compliant application server and the application 140 may be Java™-based web application, for instance. However, the Java™ application environment is only an example and is not intended to suggest any limitation.

In initial execution of the application 140 that runs on the process virtual machine 120 with the dynamic compiler 122, the dynamic compiler 122 may first profile program's behavior to find frequently executing methods (code) and then compile the frequently executing methods (code) into native machine code. The dynamic compiler 122 may also support recompiling of hot methods (code). In particular to the web application, in addition to profiling, a lot of methods (code) to be compiled may make a long queue waiting for compilation. Such profiling and compiling may require computation resources, resulting in considerable long ramp-up time until reaching a peak throughput. Certain benchmark application that emulates an online stock trading system shows that ramp-up time of more than 900 seconds is needed under a basic machine configuration with one core processor, for instance. Such a long ramp-up time may inhibit elasticity of the computing environment due to overestimation of instance throughput or overreaction of scaling mechanisms.

In cloud computing environments, a new server instance may be provisioned when the workload of the system increases. In such cases, the newly added instance would be subjected to high workload from the beginning since workloads of the system are already increased. When the instance starts up under such heavy workload conditions, the operating system may assign more resources to application threads so as to handle as many current tasks as possible, thereby suppressing activity of the compilation thread that can potentially facilitate the performance of the application thread. Also, since the performance of the application is initially low, overestimated instances would be provisioned by the scaling mechanism that may be provided by a provider.

Accordingly, there are needed methods, computer systems and computer program products capable of boosting dynamic compilation and reducing ramp-up time to improve elasticity of the computer system.

In one or more embodiments according to the present invention, a novel thread pool execution module is provided, that can control relative priority of the compilation thread without requiring root privilege and losing thread fairness.

Setting higher priority (e.g. CAP_SYS_NICE) to the compilation thread may need root privilege, however, obtaining the root privilege may not be allowed in some PaaS (Platform as a Service) environments. Setting fixed lower priority to the application thread may be harmful to thread fairness.

In preferable embodiments, the novel thread pool execution module 150 can be implemented above the operating system 110, more preferably above the process virtual machine 120. In a particular embodiment, the thread pool execution module 150 may be implemented as a particular library component 150A in the library 124. In another particular embodiment, the thread pool execution module 150 may be implemented as a particular middleware component 150B in the middleware 130.

By virtue of the novel thread pool execution module 150 according to one or more embodiments of the present invention, there are provided methods, computer systems and computer program products capable of controlling priority dynamic compilation to boost compilation without requiring root privilege and losing thread fairness, thereby improving elasticity of the computer system by reducing ramp-up time of the system.

Figure 2:
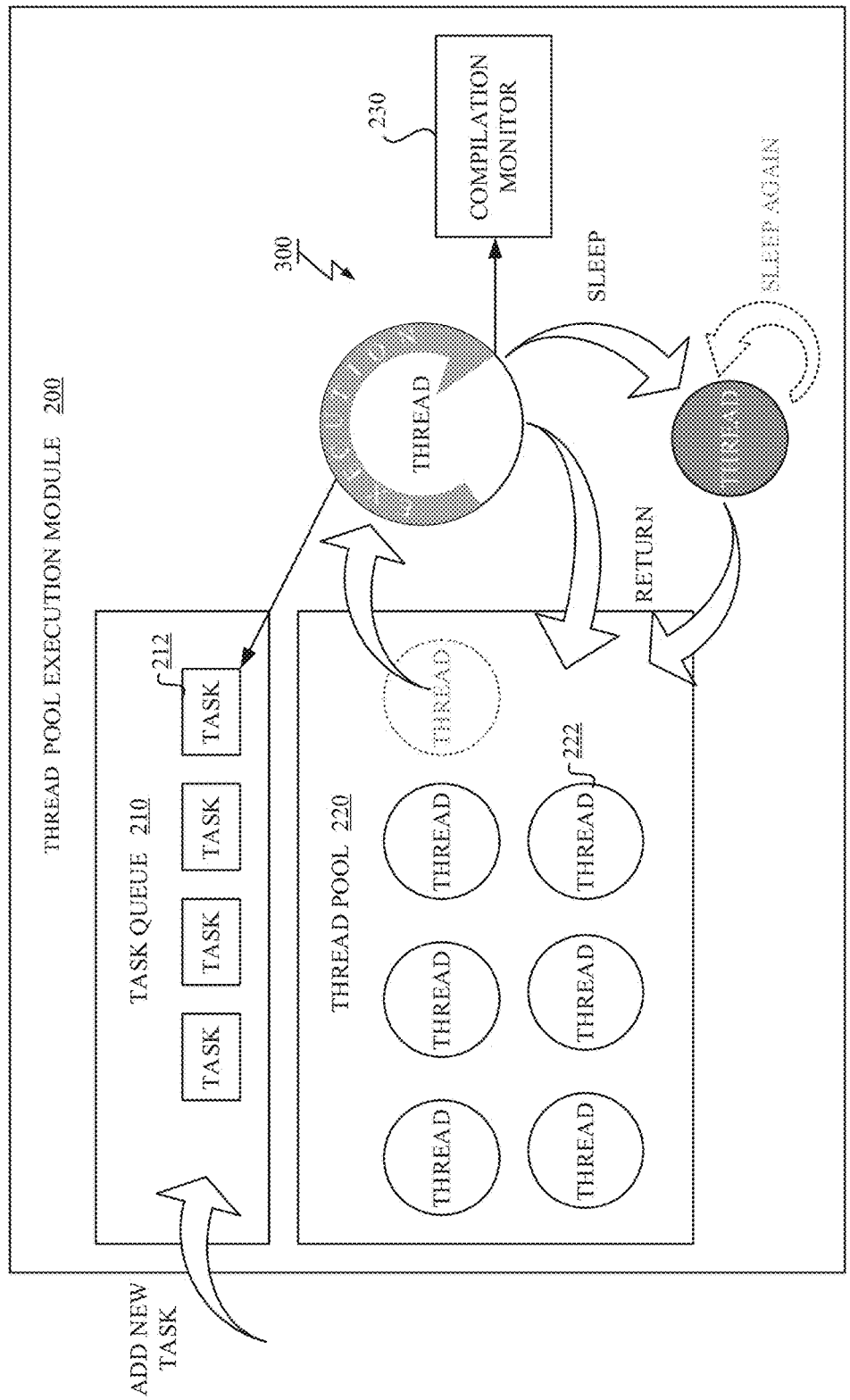
FIG. 2 illustrates a block diagram of a thread pool execution module in the computer system according to the exemplary embodiment of the present invention.

Referring now to FIG. 2, a block diagram of a thread pool execution module 200 is illustrated. As shown in FIG. 2, the thread pool execution module 200 may include a task queue 210, a thread pool 220 and a compilation monitor 230. The thread pool execution module 200 may correspond to the thread pool execution module 150A or 150B shown in FIG. 1.

The task queue 210 may transfer and hold added tasks 212. The thread pool 220 may pool one or more threads 222, each of which is used to execute added tasks. The compilation monitor 230 may monitor a metric related to the dynamic compilation. The metric may be a length of a compilation queue of the compiler thread and/or a utilization rate of the compiler thread. The utilization rate may be a CPU utilization rate, for example. The metric may allow for measuring busyness of the compilation thread.

The thread pool execution module 200 may add received task 212 to the task queue 210, and manage creation and termination of the thread 222 in the thread pool 220 to adjust the size of the thread pool 220. The thread pool execution module 200 may execute each received or queued task 212 using one of pooled threads 222 in the thread pool 220.

Referring further to FIG. 2, a behavior 300 of the thread 222 is also depicted. The thread 222 may be managed by the thread pool execution module 200. The thread 222 may execute a task given by the thread pool execution module 200.

In completing execution of the task, the thread 222 may monitor the metric provided by the compilation monitor 230 and determine whether the metric meets a predetermined criterion. The predetermined criterion may include a threshold for the length of the compilation queue and/or a threshold for the utilization rate of the compiler thread. If the length or the utilization rate exceeds a corresponding predetermined threshold, the thread 222 may determine that the metric meets the predetermined criterion. If the thread 222 determines that the metric meets the predetermined criterion, then the thread 222 may cause a lowering of priority of the thread 222 in returning of the thread 222 to the thread pool 220 for next execution.

In describing one embodiment, the lowering of priority of the thread 222 may be caused by causing the thread to sleep for a period of time before the thread 222 returns to the thread pool 220. Such sleep noise may substantially lower the priority of the thread 222. However, in another embodiment, the lowering of the priority of the thread 222 may be caused by setting lower priority to the thread (NICE of thread) before the thread 222 returns to the thread pool 220. The priority of the thread 222 may be restored to its original after a period of time. The lowering of priority of the thread 222 is preferably caused by causing sleep rather than by setting the priority because causing sleep can be expected to work more reliably than setting the priority in actual environments.

In one or more embodiments, the period of the lowering can be fixed or varied. In a particular embodiment, the thread may sleep for a predetermined period of time at once when the thread 222 returns to the thread pool 220. In another embodiment, when the thread 222 awakes, the thread 222 can monitor the metric again to determine whether the thread 222 should continue to sleep or return to the thread pool 220. In further another embodiment, the thread 222 may sleep at once for a certain period of time that may be determined based on the metric.

Figure 3:
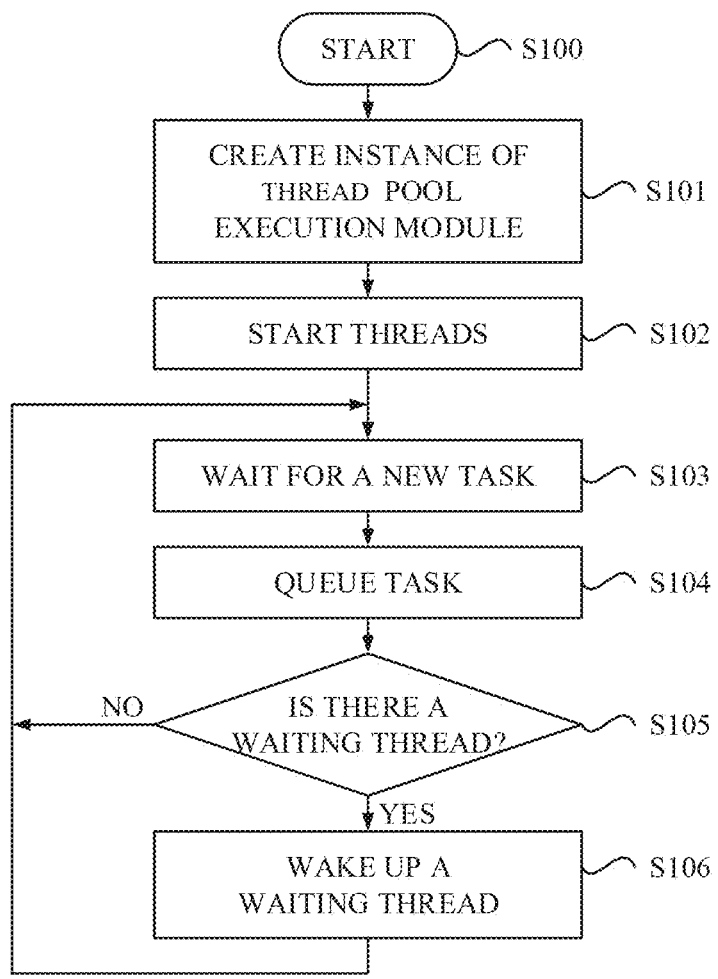
FIG. 3 is a flowchart depicting a sample routine executing tasks by using the thread pool execution module according to the exemplary embodiment of the present invention.

Referring to FIG. 3, a flowchart depicting a sample routine that executes plurality of tasks by using the thread pool execution module 200 is shown. As shown in FIG. 3, the routine begins at step S100. Note that the routine shown in FIG. 3 may be performed by a processor of the computer system in response to starting up the application 140 shown in FIG. 1. Also note that the flowchart shown in FIG. 3 is only an example incorporating a simple application logic that uses the thread pool execution module 200 according to the exemplary embodiment of the present invention.

At step S101, the processor creates an instance of the thread pool execution module 200 illustrated in FIG. 2. In step S101, one or more threads and a task queue may be prepared. At step S102, the processor causes the threads to start execution. At step 103, the processor causes the thread to wait for a new task. At step 104, the processor queues the new task to the task queue 210 so as to execute the new task with the one of the pooled threads sometime in the future. In a particular example, the task may be processing requested by a web client.

At step S105, the processor determines whether there is a waiting thread or not. If the processor determines that there is the waiting thread in step S105 (YES), then the routine branches to step S106. At step S106, the processor causes the waiting thread to wake up and then the routine loops to the step S103. If the processor determines that there is no waiting thread in step S105 (NO), then the routine loops to the step S103, directly.

Figure 4:
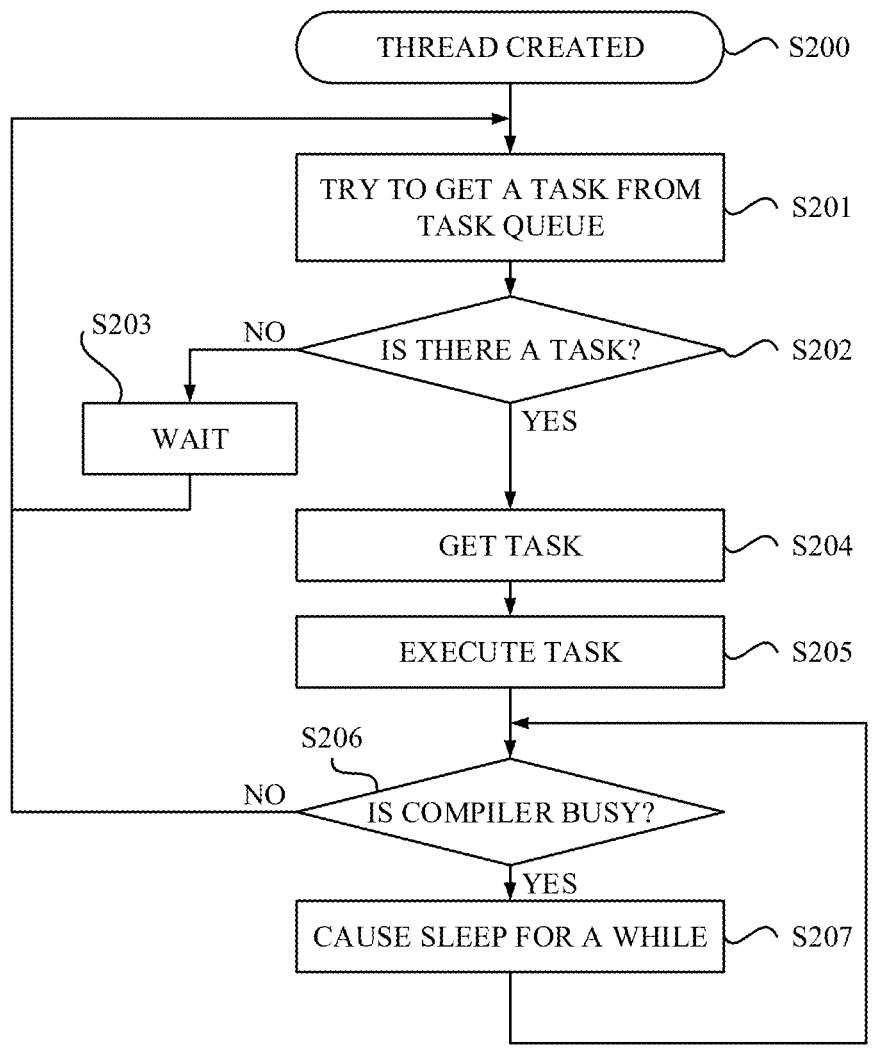
FIG. 4 is a flowchart depicting a thread routine capable of controlling priority of dynamic compilation according to the exemplary embodiment of the present invention.

Referring to FIG. 4, a flowchart depicting a thread routine capable of controlling priority of dynamic compilation is shown. As shown in FIG. 4, the thread routine begins at step S200 in response to the thread 222 of interest being created. The thread pool execution module 200 can adjust the size of thread pool 220. When a new task is added, a new thread 222 may be created to handle the task if no thread waits for a task. Note that the routine shown in FIG. 4 may be performed by the processor of the computer system.

At step S201, the thread 222 tries to get a task from the task queue 210. At step S202, the thread 222 determines whether there is a task or not in the task queue 210. If the thread 222 determines that there is no task in step S202 (NO), the routine branches to step S203. At step S203, the thread 222 waits until the routine of the thread pool wakes it up (step S106) and then the routine loops to step S201.

If the thread 222 determines that there is a task in step S202 (YES), then the routine branches to step S204. At step S204, the thread 222 gets the task from the task queue 210. At step S205, the thread 222 executes the task. The task may have been or may not have been compiled to native machine code depending on state of progress of the dynamic compilation.

Upon completion of the execution of the task, a hook may be invoked by the thread 222 such that the routine proceeds to step S206. At step S206, the thread 222 determines whether the dynamic compiler 122 is busy or not by monitoring the metric provided by the compilation monitor 230. If the thread 222 determines that the dynamic compiler 122 is not busy, then the routine branches to step S201, directly. This means that the thread 222 returns to the thread pool 220 for next execution. If the thread 222 determines that the dynamic compiler 122 is busy in step S206, then the routine branches to step S207.

At step S207, the thread 222 sleeps for a predetermined period of time (e.g. 100 msec). In the describing embodiment, when the thread 222 awakes, the routine backs to step S206 for further determination. However, in another embodiment, when the thread 222 awakes, the routine may directly loop to step S201 for next execution.

Figure 5:
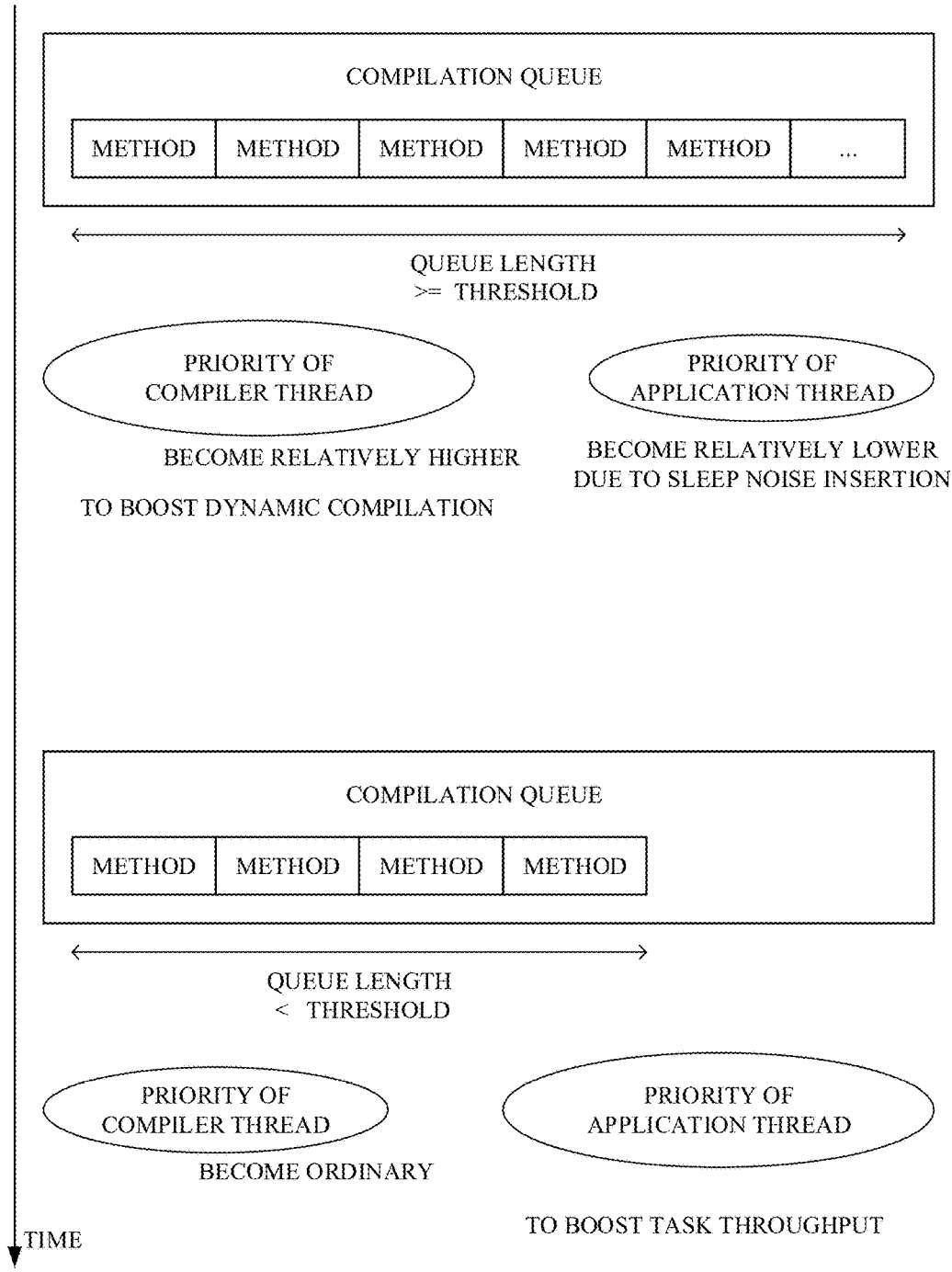
FIG. 5 depicts behavior for adjusting priorities of a compilation thread and application threads according to the exemplary embodiment of the present invention.

Referring to FIG. 5, it will be described behavior for adjusting priorities of the compilation thread and the application threads over time according to the exemplary embodiment of the present invention.

In initial execution of the application 140, a lot of methods (code) to be compiled may make a long queue in the compilation queue as shown in FIG. 5. At this point, the priority of the application thread becomes relatively lower than that of an application thread to which the novel thread pool execution module 200 is not applied, due to sleep noise inserted at task boundaries. The operating system 110 can assign more computation time taken from thread's sleep time to the compilation threads. Hence, the priority of the compiler thread can become relatively higher than that of the compiler thread that works together with the application threads to which the thread pool execution module 200 is not applied, thereby boosting activity of the compilation thread that can potentially facilitate the performance of the application thread.

As time elapses, the accumulated methods (code) are gradually compiled. If the queue length becomes shorter than the predetermined threshold, the insertion of the sleep noise may be terminated. Hence, the priority of the application thread may recover to ordinary state. Also, the priority of the compilation thread may return back to the ordinary state. At that point, sufficient amount of code may have been compiled to native machine code to facilitate application throughput. As workload of the system increases, the operating system 110 can assign more resources to the application threads so as to boost handling capability for current tasks.

Thus, ramp-up time, until reaching a peak throughput, may be preferably shortened without negatively affecting the peak throughput.

Note that the above-mentioned way of controlling the priority of the compilation thread does not need root privilege and does not harm thread fairness. Furthermore, since the lowering of the priority of the application thread is caused by inserting sleep noise at the task boundary, no negative effect on the application logic can be expected. For example, the application 140 is designed such that the thread returns to the thread pool after releasing a resource lock such as a database lock if the thread has acquired the resource lock. Thus, the thread can be prevented from sleeping with a resource lock being acquired. The operating system 110 and the process virtual machine 120 may not notice such task boundary without coordination with the application logic. Furthermore, shortening of the ramp-up time by the above-mentioned way may surpass that by imposing a limit for the amount of tasks dispatched to the machine instance to ease initial workload for the application thread.

Hereinafter, referring to the FIG. 6, it will be described a computer program product for executing a task while controlling priority of dynamic compilation according to another exemplary embodiment of the present invention.

Referring to FIG. 6A, a sample code of a computer program implementing a thread pool execution module is shown. The sample code shown in FIG. 6A is based on Java™ implementation. The sample code of the computer program may include computer-executable program code to create an instance of threadpoolexecutor class at Lines 1-7. The threadpoolexecutor class may be provided as a utility class for concurrent computing in both client and server applications. The threadpoolexecutor class is configured to execute each given task using one of pooled threads. The "threadpoolexecutor" class provides an overridable hook method that is called after execution of each given task.

The sample code may include program code to define the hook method at Lines 2-7 that is invoked upon completion of execution of the given task. The hook method is called after the completion of the execution of the given task and before returning of the thread to the thread pool for next execution.

Within the Lines 2-7, the sample code may include program code to monitor the metric related to the dynamic compilation and to determine whether the metric meets a predetermined criterion at Line 5. The sample code further includes program code to cause a lowering of priority of the thread if the metric is determined to meet the predetermined criterion at Line 6.

In the describing embodiment, the lowering of the priority is caused by causing the thread to sleep for a period of time. The metric may be a length of a compilation queue for the dynamic compilation. Alternatively, the metric may be a utilization rate of the compiler thread. The predetermined criterion may be determined to be satisfied if the queue length or the utilization rate exceeds the predetermined threshold. The thread repeatedly sleeps until the metric becomes lower than the predetermined threshold at Lines 5-6.

Referring to FIG. 6B, a sample compilation log obtained from a certain Java™ runtime environment is shown. In the log shown in FIG. 6B, bolded and underlined text "Q_SZ=* (* represents certain number)" indicates the length of the compilation queue. Such log information can be used as the metric for determining whether the thread should sleep or not.

Hereinabove, one or more embodiments and aspects of the invention have been described with particular advantages, however, some embodiments may not have the above mentioned potential advantages and these potential advantages are not necessarily required of all embodiments.

Cloud Environment Implementation

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
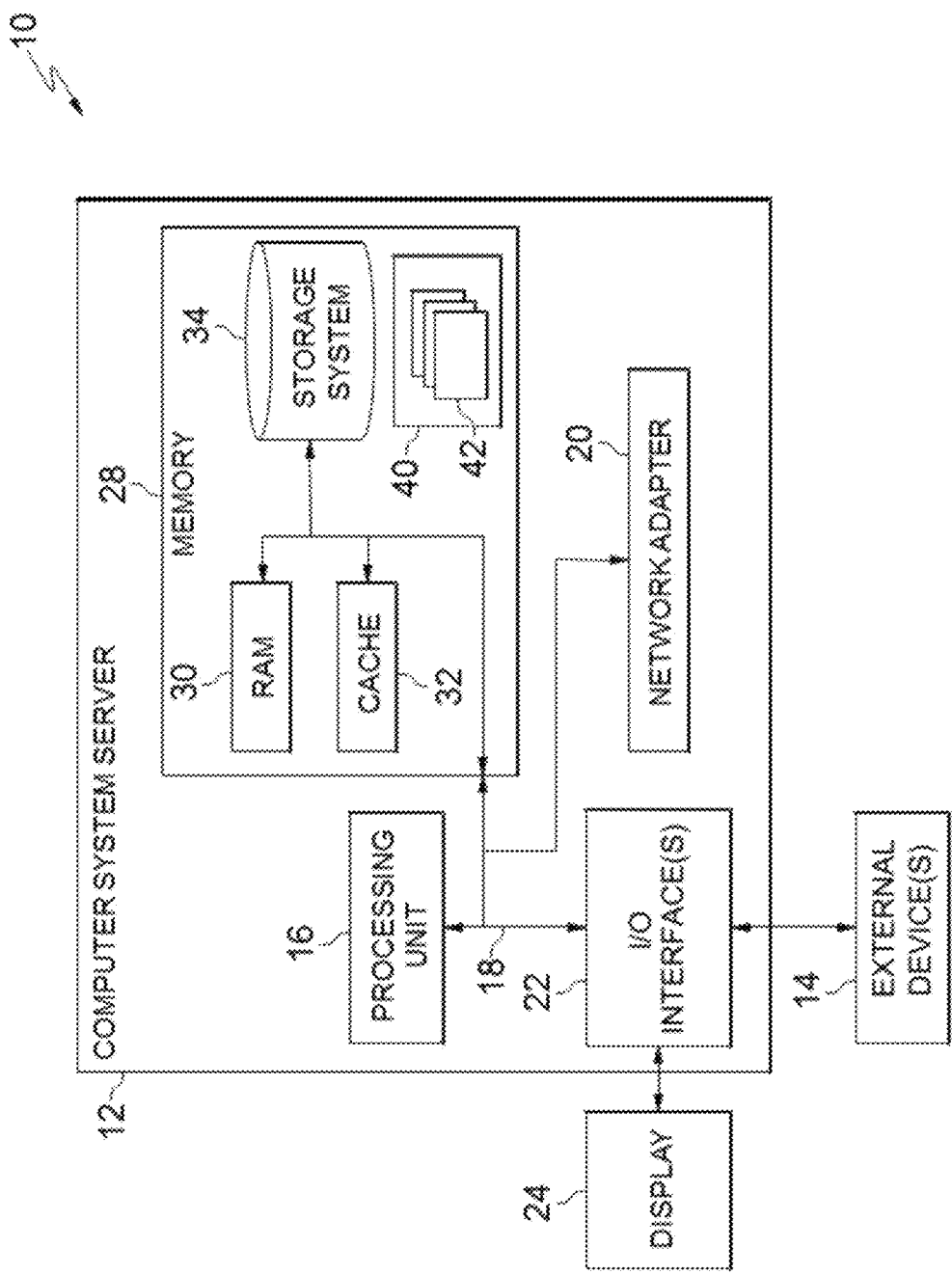
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
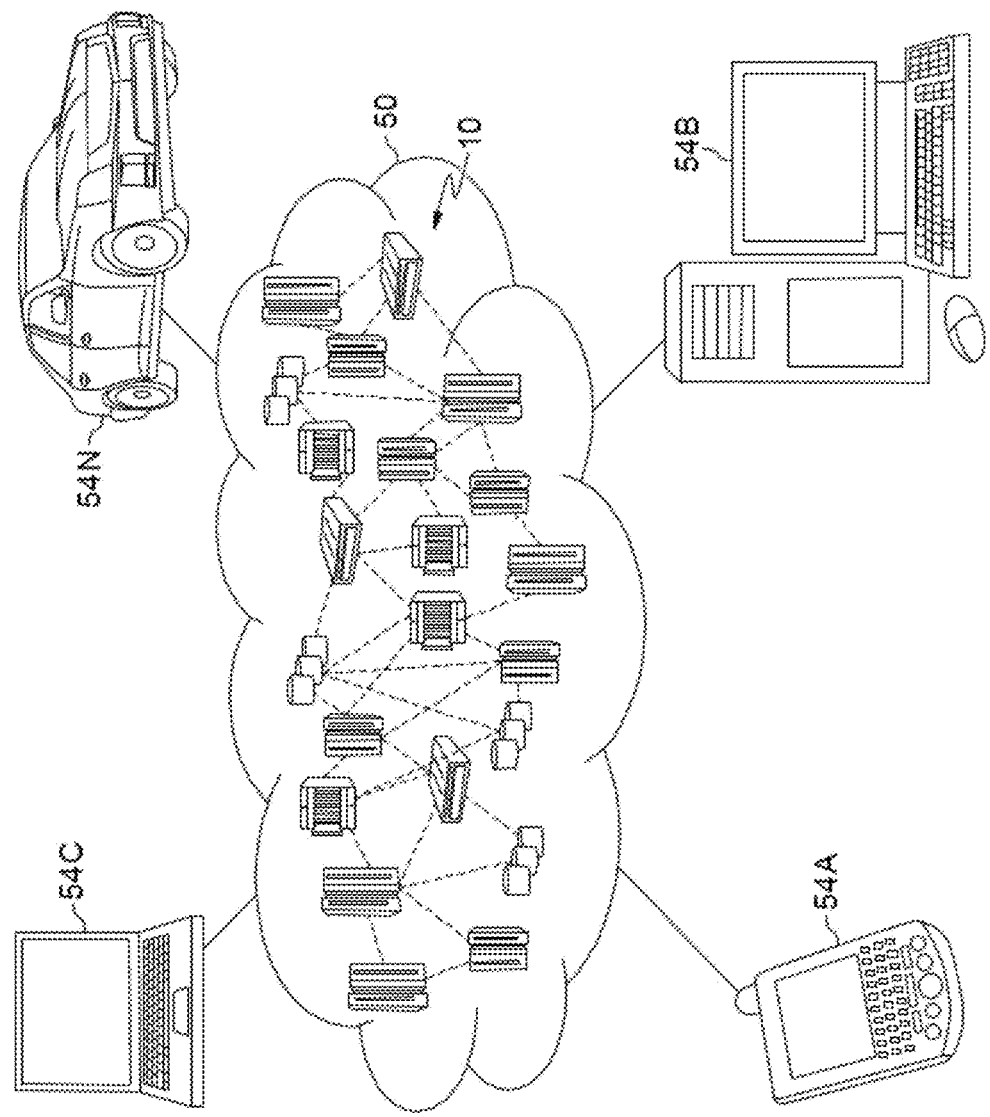
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
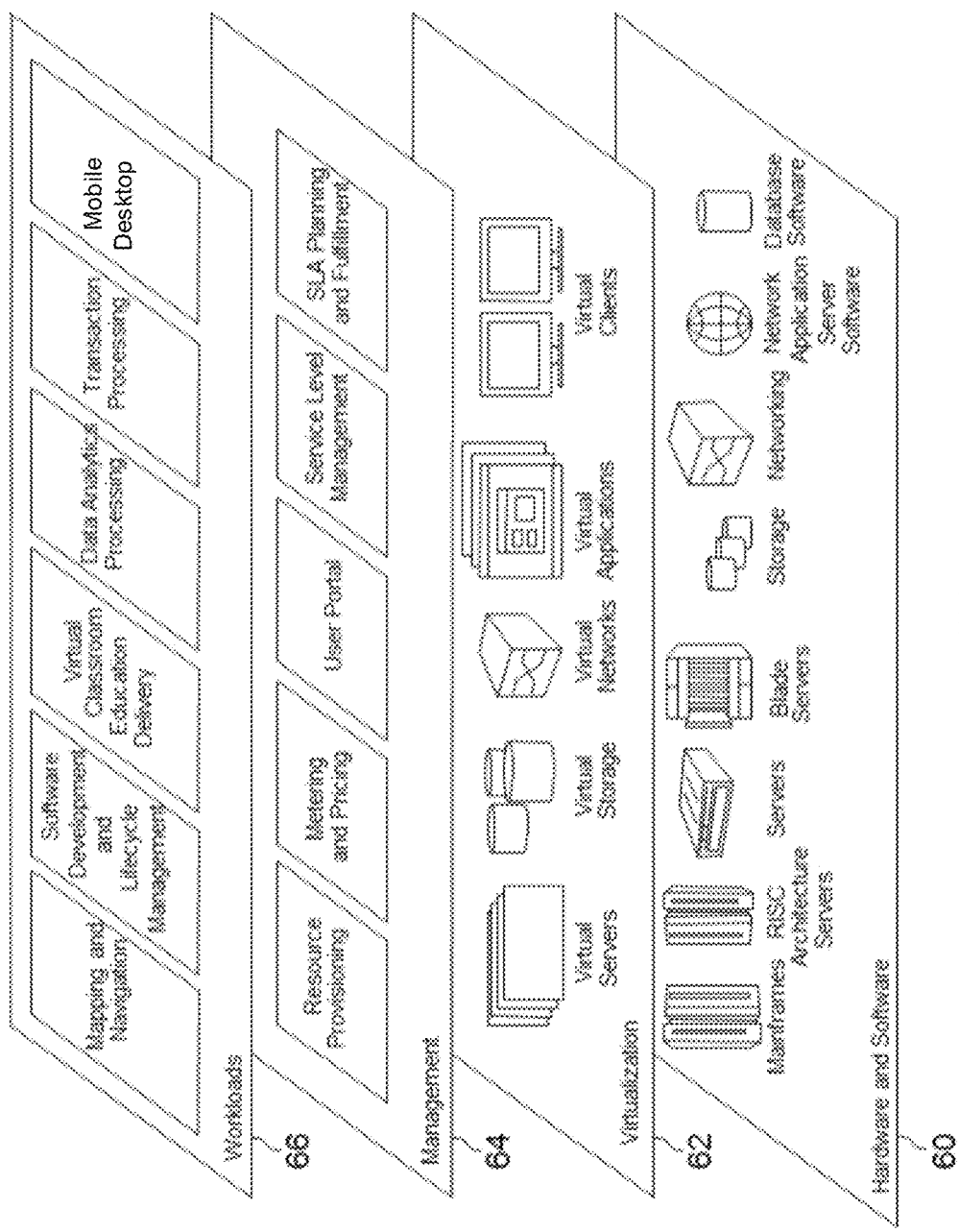
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software in one example IBM WebSphere® application server software; and database software, in one example IBM DB2® database software.

In a particular embodiments, a computer program product or software component that implements the thread pool execution module in accordance with embodiments described herein, may be provides as a service in a cloud environment. In a particular embodiment, the above-mentioned process may be performed in the cloud computing environment.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling priority of dynamic compilation by a computer system, the method comprising:
   executing compilation tasks and application tasks by using threads pooled in a thread pool;
   monitoring a metric related to the dynamic compilation;
   determining whether the metric meets a predetermined criterion; and
   increasing resources for executing compilation tasks to reach peak throughput without relying on root privilege or losing thread fairness by causing a lowering of priority of the threads executing the application tasks in returning of the threads to the thread pool for next execution by a processor if the metric is determined to meet the predetermined criterion.

2. The method of claim 1, wherein the causing includes causing the threads to sleep for a period of time before the returning.

3. The method of claim 1, wherein the causing includes setting lower priority to the threads for a period of time before the returning; and
   restoring original priority of the threads.

4. The method of claim 1, wherein the metric is a length of a compilation queue for the dynamic compilation and the metric is determined to meet the predetermined criterion if the length exceeds a predetermined threshold.

5. The method of claim 1, wherein the metric is a utilization rate of a compiler thread executing the dynamic compilation and the metric is determined to meet the predetermined criterion if the utilization rate exceeds a predetermined threshold.

6. The method of claim 1, wherein the priority of the dynamic compilation becomes higher due to the causing of the lowering of priority, thereby boosting the dynamic compilation.

7. The method of claim 1, wherein the lowering of the priority of the threads is inserted at task boundary, thereby preventing the threads from sleeping with a resource lock acquired.

8. The method of claim 1, wherein the dynamic compilation is Just-In-Time compilation.

9. The method of claim 1, wherein the method is used to execute the compilation tasks and the application tasks in a program with the dynamic compilation and the threads perform execution of the compilation tasks and the application tasks.

10. The method of claim 1, wherein the method is performed in a cloud environment.

11. A computer system for controlling priority of dynamic compilation, the computer system comprising:
a memory tangibly storing program instructions; and
a processor in communication with the memory, wherein the computer system is configured to:
execute a compilation task or an application task by using a thread pooled in a thread pool;
monitor a metric related to the dynamic compilation;
determine whether the metric meets a predetermined criterion; and
increase resources for executing compilation tasks to reach peak throughput without relying on root privilege or losing thread fairness by causing a lowering of priority of the threads executing application tasks in returning of the threads to the thread pool for next execution if the metric is determined to meet the predetermined criterion.

12. The computer system of claim 11, wherein the lowering of the priority of the threads is caused by causing the thread to sleep for a period of time before the returning.

13. The computer system of claim 11, wherein the metric is a length of a compilation queue for the dynamic compilation and the metric is determined to meet the predetermined criterion if the length exceeds a predetermined threshold.

14. The computer system of claim 11, wherein the metric is a utilization rate of a compiler thread executing the dynamic compilation and the metric is determined to meet the predetermined criterion if the utilization rate exceeds a predetermined threshold.

15. A computer program product for controlling priority of dynamic compilation, the computer program product comprising a computer readable storage medium having program instructions embodied therewith, wherein the computer readable storage medium is not a transitory signal per se, the program instructions comprising:
computer-executable program code to monitor a metric related to the dynamic compilation in completing execution of a compilation task or an application task by using a thread pooled in a thread pool;
computer-executable program code to determine whether the metric meets a predetermined criterion; and
computer-executable program code to increase resources for executing compilation tasks to reach peak throughput without relying on root privilege or losing thread fairness by causing a lowering of priority of the threads executing application tasks in returning of the threads to the thread pool for next execution if the metric is determined to meet the predetermined criterion.

16. The computer program product of claim 15, wherein the lowering of the priority of the threads is caused by causing the thread to sleep for a period of time before the returning.

17. The computer program product of claim 15, wherein the metric is a length of a compilation queue for the dynamic compilation and the metric is determined to meet the predetermined criterion if the length exceeds a predetermined threshold.

18. The computer program product of claim 15, wherein the metric is a utilization rate of a compiler thread executing the dynamic compilation and the metric is determined to meet the predetermined criterion if the utilization rate exceeds a predetermined threshold.

19. The computer program product of claim 15, wherein the computer-executable program code to monitor the metric, determine and cause the lowering of priority are implemented as a component in a software library.

20. The computer program product of claim 15, wherein the computer-executable program code to monitor the metric, determine and cause the lowering of priority are implemented as a component in middleware.

* * * * *